United States Patent Office 3,365,865
Patented Jan. 30, 1968

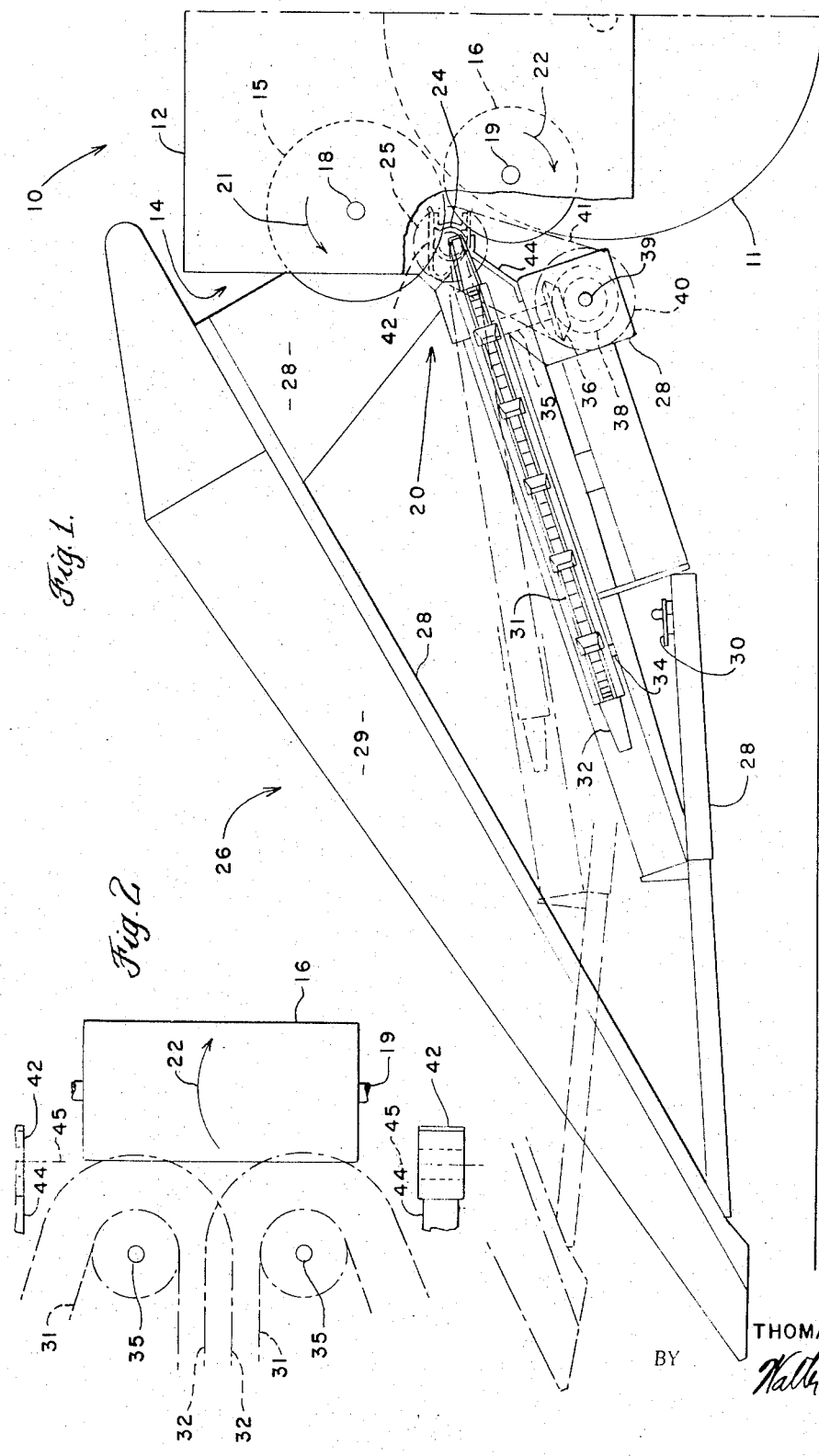

3,365,865
FORAGE HARVESTER
Thomas W. Waldrop, Ronks, Pa., assignor to Sperry Rand Corporation, New Holland, Pa., a corporation of Delaware
Filed June 21, 1965, Ser. No. 465,658
3 Claims. (Cl. 56—16)

ABSTRACT OF THE DISCLOSURE

A forage harvester having a housing adapted to travel forwardly over the ground, the housing having an infeed opening at its front end, upper and lower feed rolls in the opening forming a forward crop receiving bite, a header in front of said opening and an endless conveyor on the header which travels about vertically extending axis and has a forward crop engaging area and a rearward crop discharge point, said discharge point lying within the crop material bite of the harvester rolls, drive means being provided for the conveyor including a rotatable drive member journalled for rotation about a horizontal axis which extends through the feed roll bite, and pivot means mounting the header for pivotal movement about a predetermined horizontal axis which is coaxial with the axis of the rotatable drive member and extends through the roll bite and the conveyor release location.

---

This invention relates generally to agricultural machines of the type known as forage harvesters. More specifically, it relates to the coaction and relationship between a forage harvester and a row crop header therefor.

In the design of silage harvesting machinery for row crops such as corn or the like, the smooth continuous gathering and feeding of stalks into a forage harvester presents many challenging problems to the implement designer. The many varieties of corn and sorghum vary considerably in stalk diameter and consistency and range in height from around two feet to over fourteen feet. By harvesting time, the stalks may be blown down either parallel or transverse to the planting rows. In some areas, the stalks become entangled by viny weeds. Soil conditions and different planting practices produce other variables to be accommodated by the harvesting mechanism. Some farmers prefer to mound the earth along the rows while others attempt to level the ground in and between the rows. Some farmers prefer to cut the stalks some distance above the ground while others prefer to cut the stalks as close to the ground as possible. It is desirable for the header-harvester combination to be readily adjustable to accommodate widely varying conditions and practices.

Considerable progress has been made in recent years in improving the operating capacity of forage harvester implements and in improving the gathering and feeding capacity and capability of row crop headers. In spite of recent harvester and header improvements, stopping of the harvesting operation to clear plugged or jammed machinery remains a troublesome problem which still regularly confronts most harvester operators, particularly under severe operating conditions. This jamming frequently occurs in the area of transfer of the crop material from the header into the harvester unit. In many cases, advancements in the design of harvesters and headers have been largely offset by an inability of the mechanisms to successfully transfer material from the header to the harvester under adverse and varying operating conditions.

It is the general purpose or object of this invention to greatly reduce and substantially eliminate machinery plugging from the silage harvesting operation.

It is another object of this invention to provide a harvester-header combination having improved ability to transfer or feed material from the header into the harvester.

It is another object of this invention to provide an adjustable harvester-header combination wherein crop stalks are positively fed from the header into positive gripping engagement with feed rolls on the main harvester unit.

It is another object of this invention to provide a harvester-header combination wherein header adjustment to accommodate variations in operating conditions does not effect the transfer of crop material from the header to the harvester.

It is another object of this invention to provide a harvester-header combination wherein the pivotal adjustment axis of the header is coaxial with the axis of the power receiving member of the header drive mechanism, passes substantially through the release point of the header gathering means, and passes through the material engaging and feeding bite of the main harvester feed rolls thereby providing a close operating relationship between the harvester feeding mechanism and the header feeding mechnism while permitting ready adjustment of the header relative to the harvester.

These and other objects and advantages of this invention will be apparent upon reference to the following description and claims taken in conjunction with the accompanying drawings wherein:

FIG. 1 is a fragmentary side elevational view of a forage harvester and row crop header related in accordance with the principles of the present invention; and FIG. 2 is a fragmentary diagrammatic plan view showing the relationship of the elements of FIG. 1.

Referring now to the drawings in detail, particularly FIG. 1, the reference numeral 10 indicates, generally, a conventional forage harvester implement of the type shown in U.S. Patent 3,100,369, for example. The forage harvester is intended to travel from right to left as seen in FIG. 1 on supporting wheels 11. It includes a housing structure 12 having an inlet opening 14 in the front end thereof. Disposed in inlet opening 14 are upper and lower feed rolls 15 and 16 journalled respectively for rotation about generally horizontal transversely extending axes or shafts 18 and 19. The feed rolls 15 and 16 coact to define a crop material receiving bite therebetween on the forward side thereof as generally indicated by the reference numeral 20. In some harvesters, one or more of the feed rolls 15 or 16 may be mounted for movement away from and toward the opposite roll to compensate for varying crop conditions and feed rates. The bite 20 may be defined as the wedge-shaped space between the feed rolls on the forward side thereof. It is defined on the upper side by the area of feed roll 15 extending from approximately the nine o'clock position counterclockwise to the six o'clock position as the rolls are seen in FIG. 1. The lower portion of the bite is defined by the surface of lower feed roll 16 extending from the nine o'clock position clockwise to the 12 o'clock position. The direction of rotation of feed rolls 15 and 16 is indicated by the arrows marked 21 and 22.

Pivot members 24 (one shown) are fixedly carried by the harvester at opposite sides of the housing 12. It will be apparent in FIG. 1 that the horizontal transverse pivot axis afforded by the members 24 extends transversely through the crop material receiving bite 20 of feed rolls 15 and 16. As is common in forage harvesters, a drive sprocket 25 is provided as a part of the forage harvester drive mechanism for the purpose of driving the moving elements of the various types of headers adapted to be mounted on the front end of the forage harvester. As seen in FIG. 1, the drive sprocket 25 of the present harvester is located with its axis of rotation coaxial with the header pivot axis afforded by pivot member 24.

The reference numeral 26 indicates, generally, a row crop header having a frame 28 on which are carried the usual row dividers or fenders 29. The usual stalk cutting knives 30 (one knife unit for each row the header is designed to harvester) are provided on header frame 28 near the ground. Conventional gathering chains 31 carrying the usual stalk engaging lugs 32 are provided on the row crop header. The forward ends of chains 34 are entrained around idler sprockets 34. The rearmost portion of gathering chains 31 are entrained around sprockets whose shafts 35 extend downwardly and carry bevel gears 36. The bevel gears 36 mesh with mating bevel gears 38 carried on a jack shaft 39 extending transversely across the lower rear portion of the header. A drive sprocket 40 carried by one end of jack shaft 39 is driven from previously mentioned sprocket 25 by an endless chain 41. Additional gathering chains are commonly provided on row crop headers and have not been shown here since they do not enter into the relationship of elements constituting the present invention. The chains 31 shown in FIG. 1, and diagrammatically indicated in FIG. 2, engage the stalks in the area of the stalk severing means 30. The exact point of engagement varies in accordance with the orientation of the stalk as the header moves along the rows to be harvested. In the present invention, the gathering chains 31 have a positively defined release point at which the stalks are discharged from the gathering chains. It will be apparent in FIGS. 1 and 2 that the release point of the gathering chains 31 lies well within the limits of the material receiving bite 20 of main harvester feed rolls 15 and 16.

Pivot mounting brackets, or sleeve members, 42 are carried by the header frame by supporting brackets 44. The pivot mounting sleeves provide a horizontal transverse pivot axis indicated by the reference numeral 45 in FIG. 2 which passes through the rearmost end portions of stalk engaging lugs 32 when the lugs are extending in their fore-and-aft release position in travelling about driving sprockets 35. This axis 45 extends transversely through the bite of feed rolls 15 and 16 and is coaxial with the axis of rotation of header drive sprocket 25 and coaxial with the pivot axis afforded by sleeve members 24 on the forage harvester when the header is mounted in operative position.

In FIG. 1 the header is shown in a lower operative position in solid lines and a portion thereof is shown in an upper operative position in phantom lines. It is immediately apparent from FIG. 1 that regardless of the operative position of the header, the release point of the chain lugs 32 on the stalks carried thereby is well within the feeding bite of the main harvester feed rolls; unaffected by the angular position of the header about its adjustment axis 45; lying on the header adjustment axis; and lying on the axis of rotation of the header drive sprocket 25. This inter-relationship of the harvester feed roll bite, the gathering chain release point, the axis of rotation of the harvester drive sprocket and the pivot adjustment axis of the header relative to the harvester enables the gathering chains of the header to positively drive the severed butt ends of the stalks into gripping engagement with the harvester feed rolls thereby providing virtually unpluggable operation in transferring stalks from the header mechanism into the forage harvester. This close relationship is unaffected by a wide range of vertical adjustment positions of the header thereby providing optimum transfer of stalks from the header to the harvester regardless of the operating position of the header. The still further location of the axis of rotation of the header drive sprocket simultaneously on the release point of the gathering chains and the adjustment axis of the header enables the header to be raised or lowered without the necessity of chain slack take-up means for drive chain 41.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. The combination of a forage harvester having a housing adapted to travel forwardly over the ground, said housing having an infeed opening in the front end thereof, upper and lower horizontal feed rolls disposed in said opening and having a crop material receiving bite therebetween on the forward side thereof, a header disposed in front of said feed opening, an endless conveyor on said header which travels about vertically extending axes and has a forward crop engaging area and a rearward crop discharging point, said discharging point lying within said material receiving bite of said harvester feed rolls, drive means for said conveyor including a rotatable drive member journalled for rotation about a horizontal axis extending through said feed roll bite and said conveyor release point, and pivot means mounting said header on said harvester for pivotal movement about a predetermined horizontal axis between upper and lower operating positions, said predetermined horizontal axis being coaxial with said axis of said rotatable drive member and extending transversely through said bite of said harvester feed rolls and said conveyor release point.

2. The combination of a forage harvester having a housing adapted to travel forwardly over the ground, said housing having an infeed opening in the front end thereof, upper and lower feed rolls disposed in said opening, said feed rolls being journalled for rotation about parallel transversely extending horizontal axes and defining therebetween on the forward side of the rolls a crop material receiving bite, a row crop header disposed in front of said harvester feed rolls, an endless chain having a plurality of crop stalk engaging lugs thereon, means mounting said endless chain on said header for travel in a circuitous path about vertically extending axes to move said lugs along said header between a forwardly located stalk engaging position and a rearwardly located stalk release position, said lugs extending in the fore-and-aft direction in said release position, coacting pivot means on said header and said harvester mounting said header on said harvester for vertical pivotal movement between upper and lower operating positions, said pivot means providing a horizontal pivot axis for said header extending transversely through said bite of said harvester feed rolls and through the rearmost end portion of said lugs when the lugs are in said release position whereby the relative location of said lug release position and said bite is the same in any header operating position.

3. The combination of a forage harvester and a row crop header therefor wherein said harvester and said header have coacting pivotal mounting means for attaching said header to said harvester for vertical pivotal movement relative to the harvester about a predetermined horizontal transverse axis, said harvester comprising a housing having an infeed opening in the front end thereof and upper and lower feed rolls in said opening coacting to define a crop material receiving bite, said feed rolls being disposed on said harvester to locate said bite substantially on said predetermined axis, said header comprising a stalk conveyor which travels about vertically extending axes and has a forwardly located stalk engaging area and a rearwardly located stalk discharge point, said conveyor being disposed on said header to locate said stalk discharge point substantially on said predetermined axis whereby said discharge point lies within said bite when said header is mounted on said harvester and the relative location of said discharge point to said bite is substantially unaffected by pivotal movement of said header relative to said harvester.

References Cited

UNITED STATES PATENTS

| | | | |
|---|---|---|---|
| 2,253,633 | 8/1941 | Lindly | 56—16 |
| 2,518,732 | 8/1950 | Tuft | 56—16 |

ANTONIO F. GUIDA, *Primary Examiner.*